(12) United States Patent
Shah-Nazaroff (10) Patent No.: US 6,911,968 B2
(45) Date of Patent: Jun. 28, 2005

(54) METHOD AND APPARATUS FOR CONTROLLING A POINTER DISPLAY BASED ON THE HANDLING OF A POINTER DEVICE

(75) Inventor: Anthony A. Shah-Nazaroff, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 10/056,656

(22) Filed: Jan. 24, 2002

(65) Prior Publication Data

US 2002/0070917 A1 Jun. 13, 2002

Related U.S. Application Data

(63) Continuation of application No. 09/183,279, filed on Oct. 30, 1998, now Pat. No. 6,411,277.

(51) Int. Cl.⁷ .............................................. G09G 5/08
(52) U.S. Cl. ...................................... 345/158; 345/163
(58) Field of Search .............................. 345/156–158, 345/163–169, 145, 173, 179, 856–862, 160–167; 178/19.01–19, 19.02, 19.03, 19.04; 348/734

(56) References Cited

U.S. PATENT DOCUMENTS

| 4,317,956 | A | * | 3/1982 | Torok et al. ............. 178/18.01 |
| 4,760,386 | A | * | 7/1988 | Heath et al. ............... 345/180 |
| 5,715,020 | A | | 2/1998 | Kuroiwa et al. |
| 5,724,106 | A | * | 3/1998 | Autry et al. ............... 348/734 |
| 5,847,695 | A | * | 12/1998 | Duncan et al. ............. 345/163 |
| 5,920,304 | A | | 7/1999 | Berstis |
| 5,923,318 | A | | 7/1999 | Zhai et al. |
| 5,926,168 | A | | 7/1999 | Fan |
| 5,978,715 | A | | 11/1999 | Briffe et al. |
| 5,990,866 | A | | 11/1999 | Yollin |
| 5,990,868 | A | * | 11/1999 | Frederick .................... 345/158 |
| 5,999,167 | A | | 12/1999 | Marsh et al. |
| 6,104,380 | A | * | 8/2000 | Stork et al. ................. 345/158 |
| 6,130,666 | A | * | 10/2000 | Persidsky ................... 345/179 |
| 6,137,479 | A | * | 10/2000 | Olsen et al. ................. 345/169 |
| 6,202,212 | B1 | | 3/2001 | Sturgeon et al. |
| 6,411,277 | B1 | * | 6/2002 | Shah-Nazaroff ............ 345/157 |
| 6,559,830 | B1 | * | 5/2003 | Hinckley et al. ............ 345/157 |

FOREIGN PATENT DOCUMENTS

| CA | 2171356 | 9/1997 |
| CA | 2301834 | 3/1999 |
| WO | WO 95/32583 | 11/1995 |

OTHER PUBLICATIONS

PCT Search Report dated Feb. 2, 2000 for International Application No. PCT/US99/25377 ( 4 pages).
Harrison et al., "Squeeze Me, Hold Me, Tilt Me! An Exploration of Manipulative User Interfaces", Xerox Research Center, XP–000780770, Apr. 1998, pp. 17–24.
"Palm Sensor for Handheld Computing Devices", IBM Technical Disclosure Bulletin, vol. 40, No. 12, Dec. 1997, XP–000754144, pp. 225–228.
Supplementary European Search Report, EP 99 97 1569, 4 pages.

* cited by examiner

*Primary Examiner*—Bipin Shalwala
*Assistant Examiner*—Mansour M. Said
(74) *Attorney, Agent, or Firm*—Blakely, Sokoloff, Taylor & Zafman LLP (57) ABSTRACT

A pointing device includes a navigation unit that generates position signals that indicate where a pointer is directed. The pointing device includes a selection unit that generates selection signals that indicate that a selection is made. The pointing device includes a sensor unit that generates an active signal that indicates that the pointing device is being handled. A transmission unit is coupled to the navigation unit, selection unit, and sensor unit. The transmission unit transmits the position signals, selection signals, and active signal to a remote location.

46 Claims, 7 Drawing Sheets

METHOD AND APPARATUS FOR CONTROLLING A POINTER DISPLAY BASED ON THE HANDLING OF A POINTER DEVICE

CROSS REFERENCE TO RELATED APPLICATIONS

This continuation application claims the priority of application Ser. No. 09/183,279, filed on Oct. 30, 1998 U.S. Pat. No. 6,411,277.

FIELD OF THE INVENTION

The present invention relates to the field of pointer devices. Specifically, the present invention relates to a method and apparatus for controlling a pointer displayed on a graphical user interface based on the handling of a pointer device.

BACKGROUND OF THE INVENTION

A current trend in the electronics and computer industry is the convergence of the computer system and more traditional entertainment system components. As this convergence continues, the computing power of the computer system may be utilized to enhance a viewer's television viewing experience. Convergent systems have already been used to retrieve, store, and display entertainment system data from sources such as cable company databases, digital satellite systems (DSS), vertical blanking intervals (VBI) from broadcasts, the Internet, and other sources.

Graphical user interfaces have been used to allow viewers to access the entertainment system data on the convergent systems. The graphical user interfaces may include selectable identifiers on a display of the television next to video data from a broadcast. The selectable identifiers may be selected to display the entertainment system data. The graphical user interfaces may include a pointer to allow viewers to navigate through the graphical user interface. The pointer may be a small arrow or other symbol on the display that moves as a viewer moves a pointing device. A viewer may select commands and options by positioning the pointer over a desired selectable identifier and clicking a selection button on the pointing device.

In the past, graphical user interfaces on computer systems typically included a pointer that may be controlled by a pointing device such as a mouse, trackball, or touch pad. The pointer typically was displayed by the graphical user interface regardless of whether the pointer device was being used. In convergent systems, viewing un improving the viewing experience.

BRIEF SUMMARY OF THE INVENTION

A pointing device is disclosed. The pointing device includes a navigation generates position signals that indicate where a pointer is directed. The pointing d a selection unit that generates selection signals that indicate that a selection is made device includes a sensor unit that generates an active signal that indicates that the t is being handled. A transmission unit is coupled to the navigation unit, selection unit. The transmission unit transmits the position signals, selection signals, and active signal to a remote location.

BRIEF DESCRIPTION OF THE DRAWINGS

The present invention is illustrated by way of example and not by way of figures of the accompanying drawings, in which like references indicate similar elements and in which.

DETAILED DESCRIPTION

Figure 1:
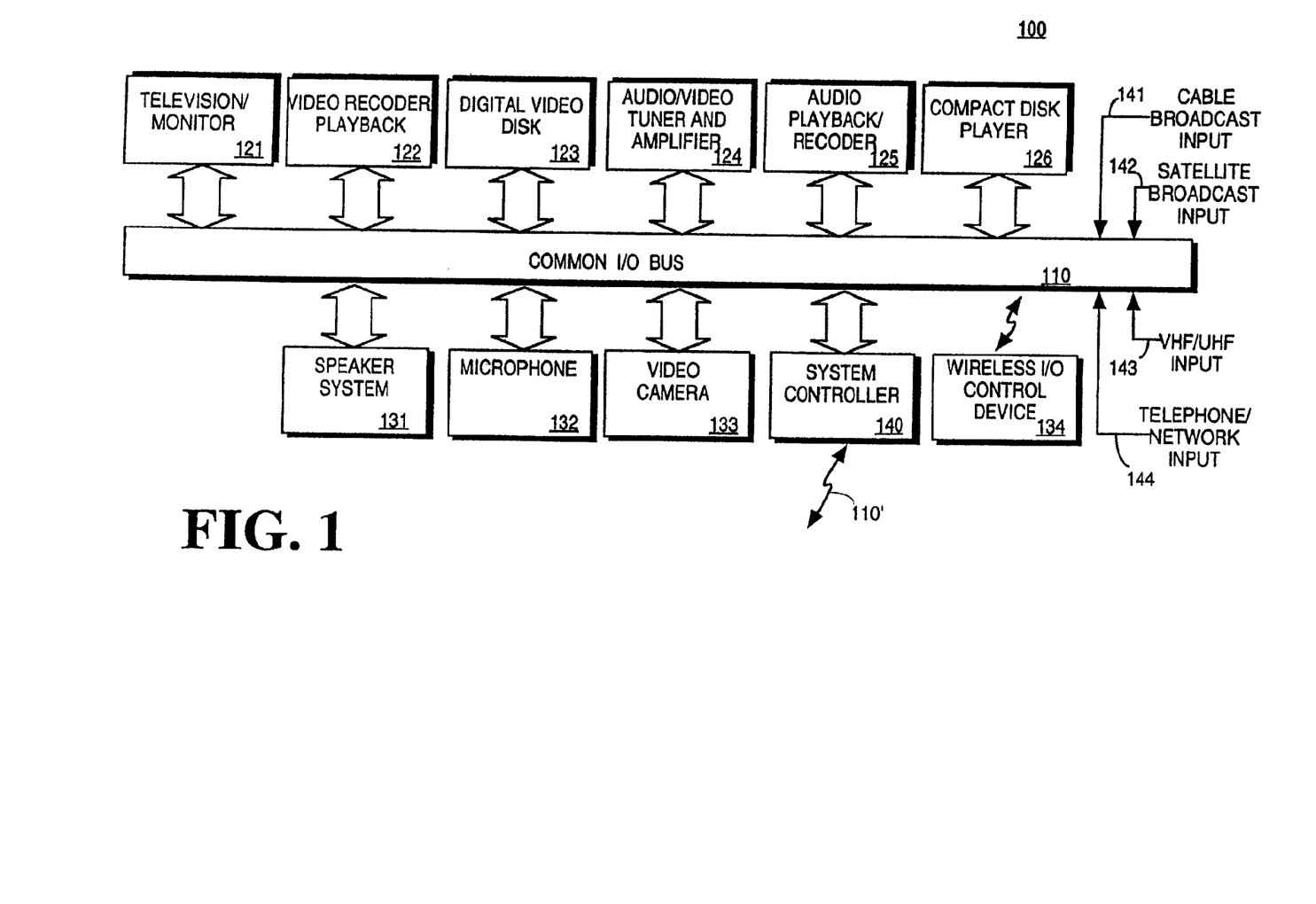
FIG. 1 is a block diagram illustrating the system components of one err entertainment system according to the present invention.

FIG. 1 is a block diagram illustrating system components of a convergent entertainment system 100 according to one embodiment of the present invention. The convergent entertainment system 100 includes a common input/output (I/O) bus 110 that connects the system components in the convergent entertainment system 100 together. It should be appreciated that the common I/O bus 110 is illustrated to simplify the routing of signals between the convergent entertainment system components. The common I/O bus 110 may represent a plurality of known mechanisms and techniques for routing I/O signals between the convergent entertainment system components. For example, the common I/O bus 110 may include an appropriate number of independent audio "patch" cables that rout audio signals, coaxial cables that rout video signals, two-wire serial lines or infrared or radio frequency transceivers that rout control signals, or other routing mechanisms that rout other signals.

In the illustrated embodiment, the convergent entertainment system 100 includes a television/monitor 121, video recorder/playback device 122, digital video disk (DVD) recorder/playback device 123, audio/video tuner and amplifier 124, audio playback/recorder device 125, and compact disk player 126 coupled to the common I/O bus. The video recorder/playback device 122, DVD recorder/playback device 123, audio playback/recorder device 125, and compact disk player 126 may be single disk or single cassette devices, or alternatively may be multiple disk or multiple cassette devices.

In addition, the convergent entertainment system 100 includes a speaker system 131, microphone 132, video camera 133, and a wireless I/O control device 134. In one embodiment, wireless I/O control device 134 is an entertainment system remote control unit, which communicates with the components of the convergent entertainment system 100 through IR signals. In another embodiment, wireless I/O control device 134 may be a wireless keyboard and pointer-positioning device that communicates with the components of convergent entertainment system 100 through IR signals or RF signals. In yet another embodiment, wireless I/O control device 134 may be an IR remote control device similar in appearance to a typical entertainment system remote control with the added feature of a track-ball, finger pad, joystick, or other navigational mechanisms which allows a user to position a pointer on a display of the convergent entertainment system 100.

The convergent entertainment system 100 also includes a system controller 140.

According to one embodiment of the present invention, the system controller 140 operates to store and display entertainment system data available from a plurality of entertainment system data sources. According to another embodiment of the present invention, the system controller 140 is configured to control a wide variety of features associated with each of the system components. As shown in FIG. 1, the system controller 140 is coupled, either directly or indirectly, to each of the convergent entertainment system components, as necessary, through I/O bus 110. In one embodiment, in addition to or in place of I/O bus 110, system controller 140 is configured with a wireless communication transmitter (or transceiver), which is capable of communicating with the system components via IR signals or RF signals 110'. Regardless of the control medium, the system controller 140 is configured to control one or more of the convergent entertainment system components of the convergent entertainment system 100, although it is understood that each of the components may be individually controlled with wireless I/O control device 134.

As illustrated in FIG. 1, the convergent entertainment system 100 may be configured to receive entertainment selections and entertainment system data from various entertainment selection sources. In one embodiment, the convergent entertainment system 100 receives entertainment selections and entertainment system data from any or all of the following sources: cable broadcast 141, satellite broadcast 142 (e.g., via a satellite dish), very high frequency (VHF) or ultra high frequency (UHF) radio frequency communication of the broadcast networks 143 (e.g., via an aerial antenna), telephone/computer network broadcast 144, and/or information stored locally at system controller 140 or another component of the entertainment system 100. Further, it will be appreciated by one skilled in the art, that cable broadcast input 141, satellite broadcast input 142 and VHF/UHF input 143 may receive input from digital broadcast programming and digital cable programming. The cable broadcast input 141, satellite broadcast input 142, VHF/UHF broadcast input 143, and telephone/computer network broadcast input 144 may be received by the audio/video tuner and amplifier 124, the system controller 140, or other component on the convergent entertainment system 100.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
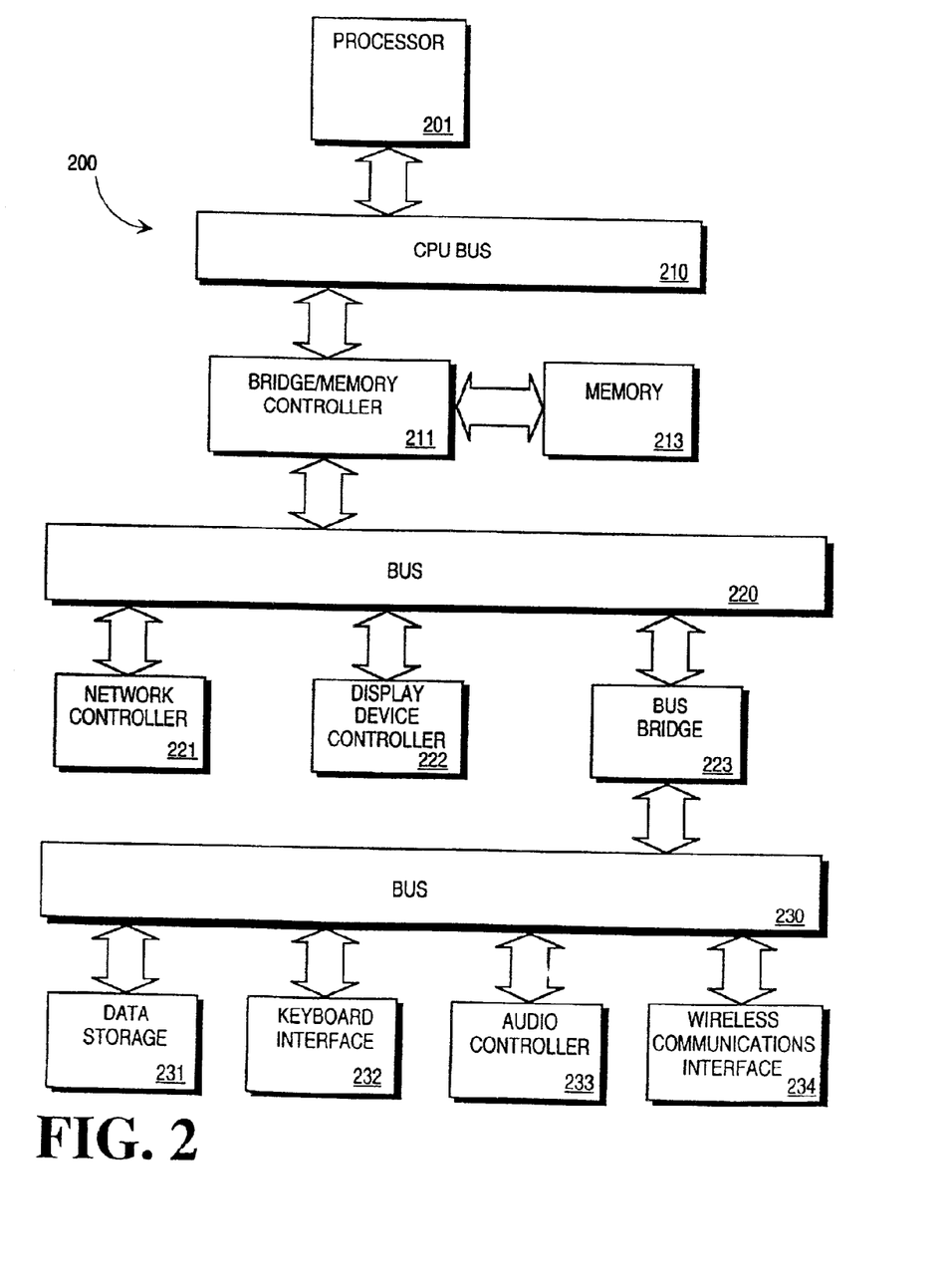
FIG. 2 is a block diagram illustrating one embodiment of a system cont to the present invention.

FIG. 2 is a block diagram illustrating an embodiment of a computer system 200 that may be used to implement the system controller 140 according to the present invention. The computer system 200 includes a processor 201 that processes data signals. The processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210, which transmits data signals between processor 201 and other components in the computer system 200.

As an example, memory 213 may be a dynamic random access memory (DRAM) device, a static random access memory (SRAM) device, or other memory device. The memory 213 stores data signals that are executed by the processor 201. A bridge memory controller 211 is coupled to the CPU bus 210 and the memory 213. The bridge memory controller 211 directs data signals between the processor 201, the memory 213, and other components in the computer system 200 and bridges the data signals from these components to a first I/O bus 220.

The first I/O bus 220 may be a single bus or a combination of multiple buses. As an example, the first I/O bus 220 maybe a high performance I/O bus that operates at high throughput rates. The first I/O bus 220 may include for example a Peripheral Components Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers and supports communication among the machines. A display device controller 222 is coupled to the first I/O bus 220. The display device controller 222 allows coupling of a display device (not shown) to the computer system 200 and acts as an interface between the display device and the computer system 200. The display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. According to an embodiment of the present invention, the display device may be implemented by the television/monitor 121 (shown in FIG. 1).

A second I/O bus 230 may be a single bus or a combination of multiple buses. The second I/O bus 230 may include an Industry Standard Architecture (ISA) bus, an Extended Industry Standard Architecture (EISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, or other mass storage device. A keyboard interface 232 is coupled to the second I/O bus 230. The keyboard interface 232 may be a keyboard controller or other keyboard interface. The keyboard interface 232 may be a dedicated device or can reside 25 in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds. A wireless communications interface 234 is coupled to the second I/O bus 230. The wireless communications interface 234 may be an IR transceiver or a RF transceiver for transmitting and receiving signals between system components of the convergent entertainment system 100 (shown in FIG. 1).

A bus bridge 223 couples the first I/O bus 220 to the second I/O bus 230. The bus bridge 223 operates to buffer and bridge data signals between the first I/O bus 220 and the second I/O bus 230.

According to one embodiment, displaying a pointer on a display device is performed by the computer system 200 in response to the processor 201 executing sequences of instructions contained in the memory 213. Such instructions may be read into the memory 213 from other computer-readable mediums such as data storage device 231 or from a computer connected to the network via the network controller 211. Execution of the sequences of instructions contained in the memory 213 causes the processor to display the pointer on the display device, as will be described hereafter. In alternative embodiments, hard-wire circuitry may be used in place of or in combination with software instructions to implement the present invention. Thus, the present invention is not limited to any specific combination of hardware circuitry and software.

Figure 3:
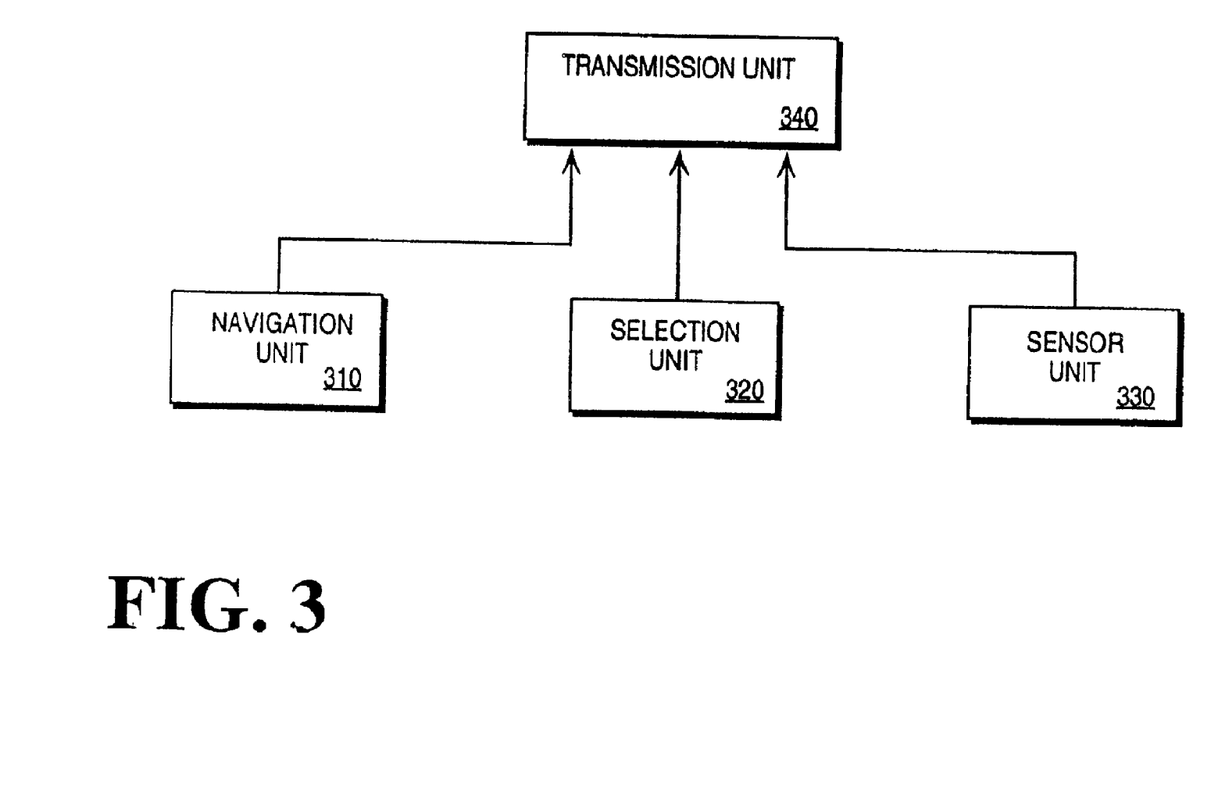
FIG. 3 is a block diagram of a pointing device according to an embodiment of the present invention.

FIG. 3 is a block diagram of a pointing device 300 according to an embodiment of the present invention. The pointing device 300 may be implemented as the wireless I/O control device 134 (shown in FIG. 1). The pointing device 300 includes a navigation unit 310. The navigation unit 310 generates position signals indicating where a pointer is to be directed on a display device. The position signals may include signals that describe a coordinate on a defined coordinate system to move the pointer. The navigation unit 310 includes a position input unit (not shown) that allows a viewer to direct the positioning of the pointer. The position input unit may be a trackball, a touch pad, joystick, a plurality of navigation buttons, or other position input device.

The pointing device 300 includes a selection unit 320. The selection unit 320 generates selection signals indicating when a selection is made. The selection unit 320 may include a button or other selection device on the pointing device 300. A viewer handling the pointing device 300 makes a selection by positioning the pointer with the navigation unit 310 onto a selectable identifier on the graphical user interface and pushing the button in the selection unit 320.

The pointing device 300 includes a sensor unit 330. The sensor unit 330 generates an active signal indicating that the pointing device 300 is being handled. The sensor unit 330 may include a pressure sensor, a motion sensor, or other sensing device that detects when the pointing device 300 is being handled. The sensor unit 330 may be configured on the pointing device 300 such that the sensor unit 330 is triggered whenever the navigation unit 310 or the selection unit 320 is being used. According to an embodiment of the present invention, the sensitivity of the sensor unit 330 may be set such that certain types of handling of the pointing device 300 will not trigger the sensor unit 330.

The pointing device 300 includes a transmission unit 340. The transmission unit 340 is coupled to the navigation unit 310, selection unit 320, and sensor unit 330. The transmission unit 340 receives the position signals from the navigation unit 310, the selection signals from the selection unit 320, and the active signal from the sensor unit 330. The transmission unit 340 transmits the position signals, selection signals, and active signal to a remote location. The transmission unit 340 may include an IR transmitter, an RF transmitter, or other transmitting device. According to an embodiment of the present invention, the transmission unit 340 transmits the position signals, selection signals, and active signal to the wireless communications interface 234 (shown in FIG. 2) of the computer system 200. It should be appreciated that the navigation unit 310, selection unit 320, sensor unit 330, and transmission unit 340 may be implemented using any known circuitry or technique.

Figure 4:
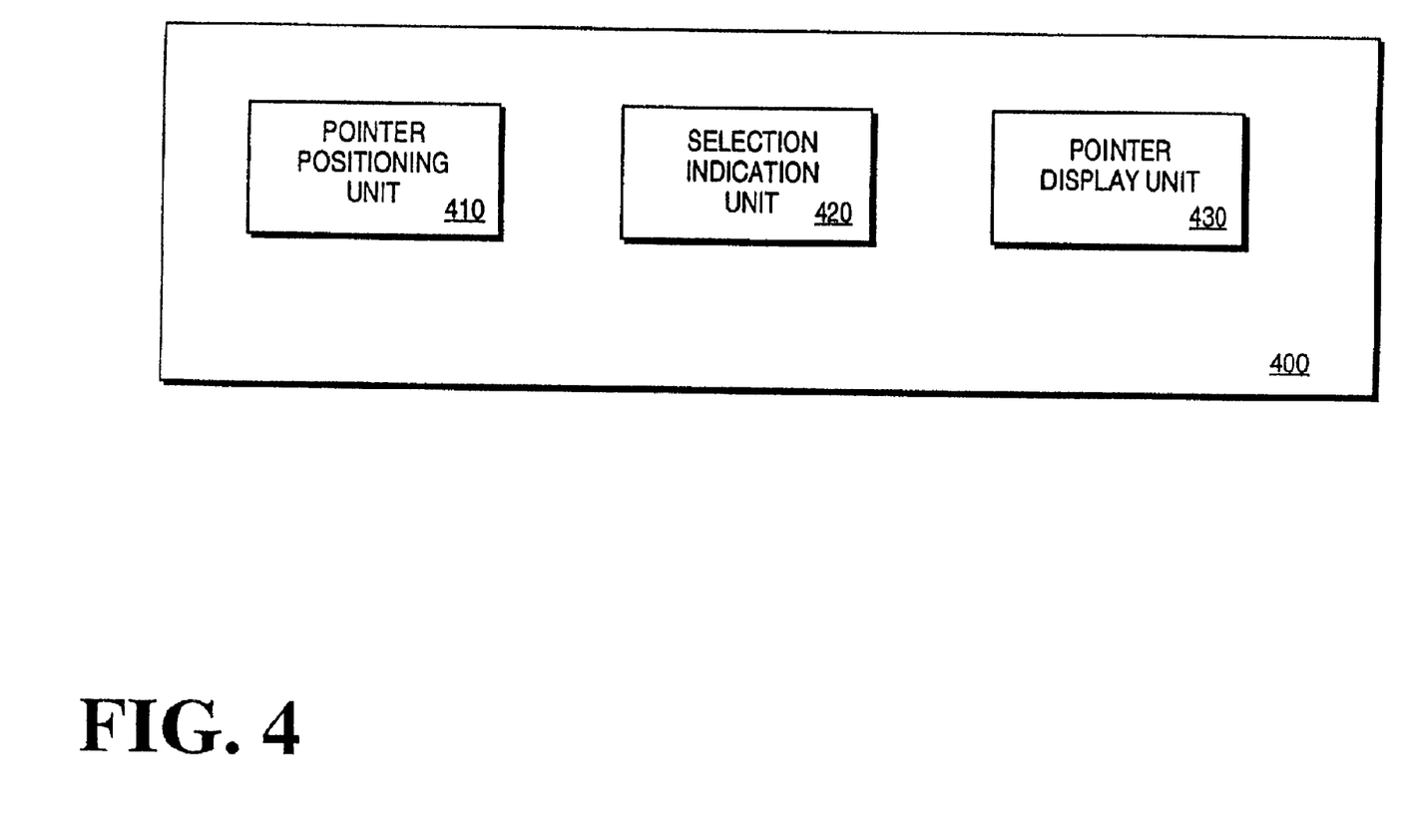
FIG. 4 is a block diagram of modules supporting a pointing device according to an embodiment of the present invention.

FIG. 4 is a block diagram of modules 400 supporting the pointing device 300 (shown in FIG. 3) according to an embodiment of the present invention. In a preferred embodiment of the present invention, the modules 400 are implemented in software and reside in main memory 213 (shown in FIG. 2) of the computer system 200 (shown in FIG. 2) as sequences of instructions. It should be appreciated that the modules 400 may be implemented by hardware as components coupled to the bus 220 (shown in FIG. 2) or a combination of both hardware and software. The modules 400 may be implemented in a device driver for the pointing device 300. The modules 400 include a pointer positioning unit 410. The pointer positioning unit 410 moves a position of a pointer presented on a display device in response to position signals received from the pointing device 300. The modules 400 include a selection indication unit 420. The selection indication unit 420 notifies the computer system 200 that a selectable identifier on a graphical user interface has been selected in response to selection signals received from the pointing device 300. The modules 400 include a pointer display unit 430. The pointer display unit 430 displays the pointer on the display device in response to an active signal received from the pointing device 300. After the pointer display unit 430 stops receiving an active signal from the pointing device 300, the pointer display stops displaying the pointer or "hides" the pointer on the display device and allows video images on the display device to be displayed unobstructed by the pointer. According to an embodiment of the present invention, the pointer display unit 430 includes a timer unit (not shown) that allows the pointer display unit 430 to stop displaying the pointer after a predefined period of time after the active signal is not received from the pointing device 300.

The pointer positioning unit 410, the selection indication unit 420, and the pointer display unit 430 may be implemented using any known circuitry or technique. In an embodiment of the present invention where the modules 400 are implemented in hardware, the pointer positioning unit 410, the selection indication unit 420, and the pointer display unit 430 all reside on a single semiconductor substrate.

Figure 5A:
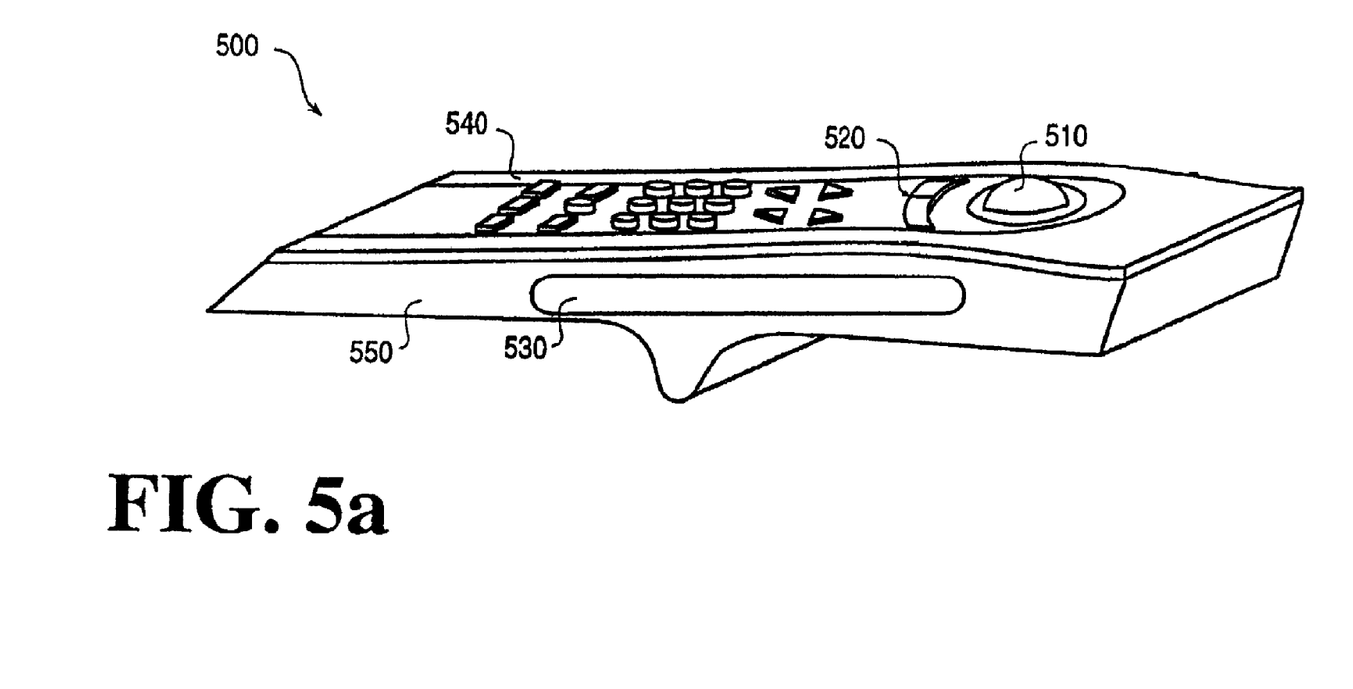
FIG. 5a illustrates a side view of a pointing device according to an embodiment of the present invention.
Figure 5B:
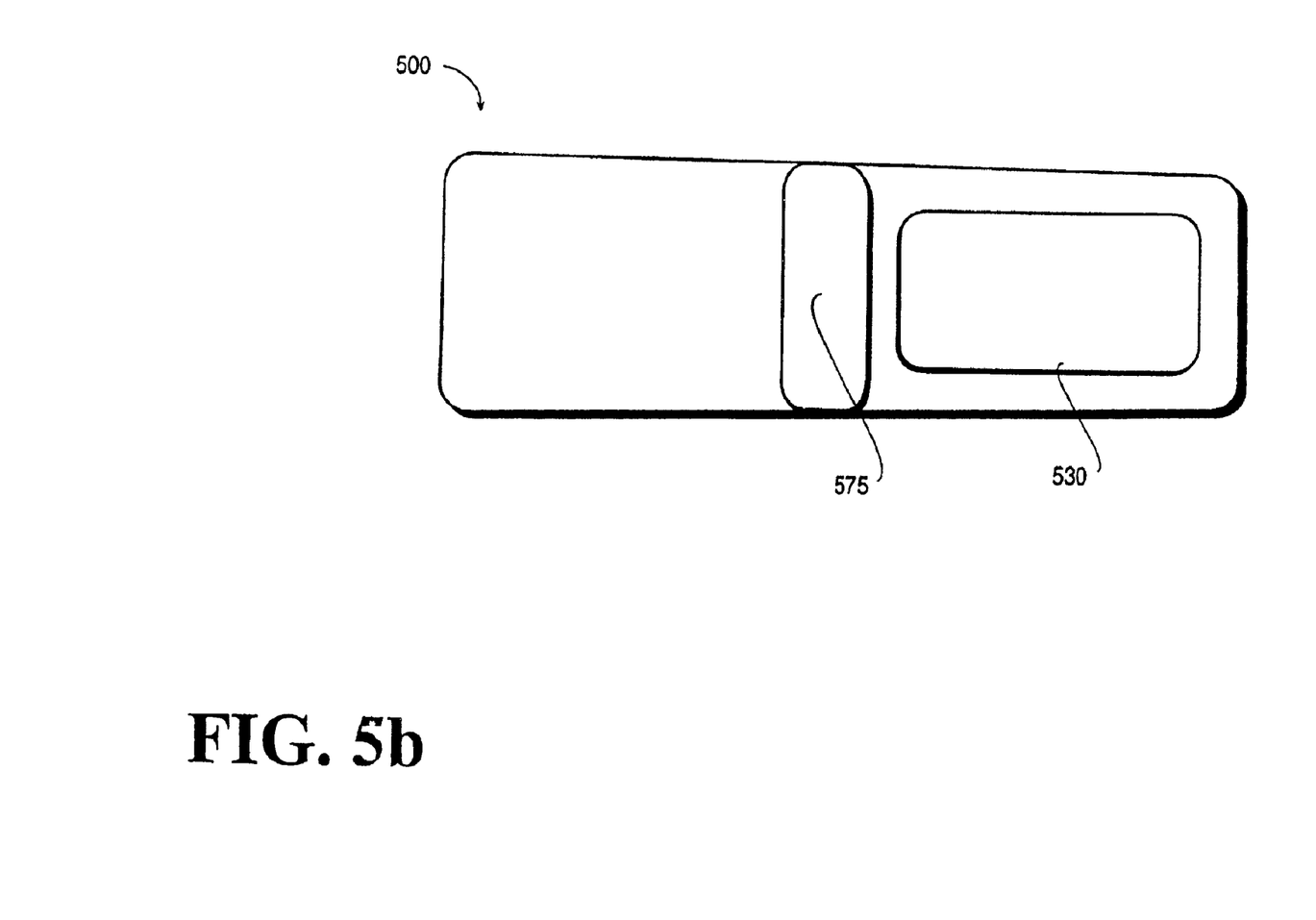
FIG. 5b illustrates a bottom view of a pointing device according to an embodiment of the present invention.

FIG. 5*a* illustrates a side view of a pointing device 500 according to an embodiment of the present invention and FIG. 5*b* illustrates a bottom view of the pointing device 500. The pointing device 500 may be implemented as the pointing device 300 shown in FIG. 3. The pointing device 500 includes a position input unit 510. The position input unit 510 allows a person handling the pointing device 500 to direct a position of a pointer on a graphical user interface. The position input unit 510 shown on the pointing device 500 is a trackball. It should be appreciated that the position input unit 510 may alternatively include a finger pad, a joy stick, a plurality of navigation buttons, or other input device.

The pointing device 500 includes selection buttons 520. The selection buttons 520 allows a person handling the pointing device 500 to selection options on a graphical user interface by positioning a pointer onto a selectable identifier and pushing one of the selection buttons 520. It should be appreciated that other selection devices may be used in place of the selection buttons 520.

The pointing device 500 includes pressure sensor 530. When depressed, the pressure sensor 530 detects that the pointing device 500 is being handled. The pressure sensor 530 is positioned at the side surfaces 550 of the pointing device 500 and on the bottom surface 575 of the pointing device 500 (see FIG. 5*b*). By positioning the pressure sensor 530 at locations on the pointing device 500 where a person wishing to use the pointing device 500 would have to depress the pressure sensor 530, the pressure sensor 530 is able to detect whenever the pointing device is being handled. The sensor unit 330 (shown in FIG. 3) generates an active signal in response to the pressure sensor 530 detecting that the pointing device 500 is being handled. It should be appreciated that other sensing devices such as a motion sensor, a touch sensitive trigger, or other sensing device may be used in place of the pressure sensor 530. It should also be appreciated that the pressure sensor 530 or other sensing device may be positioned at other locations on the pointing device 500 than that illustrated in FIGS. 5a and 5b. The pointing device 500 also includes additional selection buttons 540 that allows a person handling the pointing device 500 to make programming selections.

Figure 6:
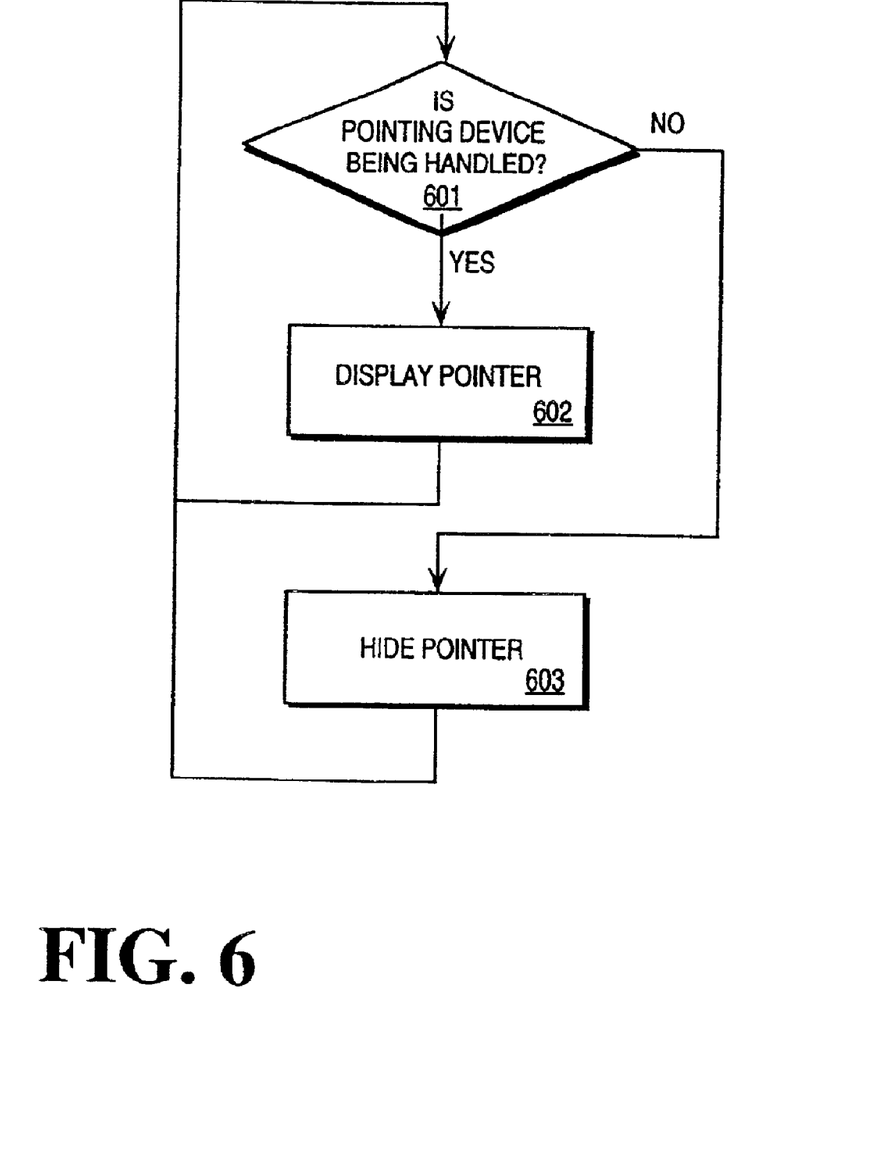
FIG. 6 is a flow chart illustrating a method for displaying a pointer on a according to an embodiment of the present invention.

FIG. 6 is a flow chart illustrating a method for displaying a pointer on a display device according to an embodiment of the present invention. At step 601, it is determined whether a pointing device is being handled. If the pointing device is being handled, control proceeds to step 602. If the pointing device is not being handled, control proceeds to step 603. According to an embodiment of the present invention, the step of determining whether the pointing device is being handled is achieved by monitoring an interface for an active signal from the pointing device.

At step 602, the pointer is displayed on the display device.

At step 603, the pointer is hidden on the display device. According to an embodiment of the present invention, hiding the pointer on the display device is performed after a predetermined period of time after the pointing device has stopped being handled.

In the foregoing specification, the invention has been described with references to 10 specific embodiments thereof. It will, however be evident that various modifications and changes may be made thereto without departing from the broader spirit and scope of the invention. The specification and drawings are, accordingly, to be regarded in an illustrative rather than restrictive sense.

What is claimed is:

1. A computer system comprising:
   a bus;
   a display device coupled to the bus to display video images;
   a processor coupled to the bus;
   a wireless communications interface coupled to the bus; and
   a device driver coupled to the wireless communications interface, the device driver, including a pointer display unit to display a pointer on the display device in response to an active signal received from the wireless communications interface, the active signal being independent of any position direction and any option selection, the pointer display unit also to stop displaying the pointer in response to not receiving the active signal to allow video images to be displayed on the display device unobstructed by the pointer.

2. The computer system of claim 1, wherein the device driver further comprises a timer unit to allow the pointer display unit to stop displaying the pointer after a predefined period of time after the active signal is not received from the wireless communications interface.

3. The computer system of claim 1, wherein the device driver further comprises a pointer positioning unit to move a position of the pointer presented on the display device in response to position signals received from wireless communications interface.

4. The computer system of claim 3, wherein the device driver further comprises a selection indication unit to notify the computer system that a selectable identifier on the display device has been selected in response to selection signals from the wireless communications interface.

5. The computer system of claim 1, further comprising a remote wireless pointing device, the wireless communications interface receiving the active signals from the remote pointing device.

6. The computer system of claim 5, wherein the active signal is indicative of the pointing device being held.

7. The computer system of claim 5, wherein the active signal is indicative of a pressure sensor on the pointing device being depressed.

8. The computer system of claim 1, wherein the pointer display unit monitors the wireless communications interface for the active signal.

9. A device driver for a pointing device, comprising:
   a pointer display unit to display a pointer on a display device of an entertainment system in response to an active signal received from the pointing device, the active signal being independent of any position direction and any option selection;
   the pointer display unit also to stop displaying the pointer in response to not receiving the active signal to allow video images to be displayed on the display device unobstructed by the pointer.

10. The driver of claim 9, further comprising a timer unit to allow the pointer display unit to stop displaying the pointer after a predefined period of time after the wireless remote control unit active signal is not received from the pointing device, the active signal being indicative of the pointing device being held.

11. The driver of claim 9, further comprising a pointer positioning unit to move a position of a pointer presented on the display device in response to position signals received from the pointing device.

12. The driver of claim 11, further comprising a selection indication unit to notify a computer system that a selectable identifier on the display device has been selected in response to selection signals received from the pointing device.

13. The driver of claim 12, wherein the pointer display unit, the pointer positioning unit, and the selection indication unit reside on a single semiconductor substrate.

14. The driver of claim 9, wherein the active signal is indicative of the pointing device being held.

15. A machine-readable medium having stored thereon data representing instructions which, when executed by a machine, cause the machine to perform operations comprising:
   displaying a pointer on a display device of an entertainment system in response to an active signal received from a pointing device, the active signal being independent of any position direction and any option selection;
   stopping the pointer display in response to not receiving the active signal to allow video images to be displayed on the display device unobstructed by the pointer.

16. The medium of claim 15, further comprising instructions which, when executed by the machine, cause the machine to perform further operations comprising stopping the pointer display after a predefined period of time after the active signal is not received from the pointing device.

17. The medium of claim 15, further comprising instructions which, when executed by the machine, cause the machine to perform further operations comprising moving the position of the pointer in response to position signals received from the pointing device.

18. The medium of claim 17, further comprising instructions which, when executed by the machine, cause the machine to perform further operations comprising notifying a computer system that a selectable identifier on the display device has been selected in response to selection signals received from the pointing device.

19. A method comprising:
   determining whether a pointing device is being handled without a selection or position change being indicated;
   displaying the pointer on a display device if the pointing device is being handled without a selection or position change being indicated; and
   hiding the pointer on the display device if the pointing device is not being handled.

20. The method of claim 19, wherein determining whether the pointing device is being handled comprises monitoring an interface for an active signal from the pointing device, the active signal indicating that the pointing device is being handled without a selection or position change being indicated.

21. The method of claim 19, wherein determining whether the pointing device is being handled comprises monitoring an interface for an active signal from the pointing device, the active signal indicating that a pressure sensor on the pointing device is being depressed.

22. The method of claim 19, wherein determining whether the pointing device is being handled comprises monitoring an interface for an active signal from the pointing device, the active signal indicating that a motion sensor on the pointing device is being triggered.

23. The method of claim 19, wherein hiding the pointer comprises hiding the pointer on the display device after a predetermined period of time after the pointing device has stopped being handled.

24. A wireless remote control unit for an entertainment system comprising: a sensor unit that generates an active signal independent of the selection of any position direction, any command, and any option; and a transmission unit, coupled to the navigation unit, to transmit the active signal to a wireless receiver of an entertainment system, the active signal being transmitted to display a pointer on a display device of the entertainment system, the pointer being hidden on the display device before the active signal is transmitted to allow video images on the display device to be displayed unobstructed by the pointer.

25. The unit of claim 24, wherein the sensor unit comprises a pressure sensor.

26. The unit of claim 25, wherein the pressure sensor is located where a person using the wireless remote control unit would have to depress it.

27. The unit of claim 25, wherein the pressure sensor is located on the bottom of the wireless remote control unit.

28. The unit of claim 24, wherein the sensor unit comprises a motion sensor.

29. The unit of claim 24, further comprising a navigation unit to generate position signals to direct the position of the pointer on the display device and wherein the transmission unit further transmits the position signals to the wireless receiver of the entertainment system.

30. The unit of claim 29, wherein the navigation unit comprises a trackball.

31. The unit of claim 29, wherein the navigation unit comprises a finger pad.

32. The unit of claim 29, wherein the navigation unit comprises a plurality of navigation buttons.

33. The unit of claim 24, further comprising a selection unit to generate selection signals indicating a selection of an option related to the position of the pointer on the display device and wherein the transmission unit further transmits the selection signals to the wireless receiver of the entertainment system.

34. A pointing device, comprising: a navigation unit to generate position signals indicating where a pointer is to be directed on a display device; a selection unit to generate selection signals indicating when a selection is made; a sensor unit, independent of the navigation unit and the selection unit, to generate an active signal indicating that the pointing device is being handled; and a transmission unit coupled to the navigation unit, the selection unit and the sensor unit to receive the position signals, the selection signals and the active signal and transmit them to a remote location; the active signal being transmitted to display a pointer on the display device, the pointer being hidden on the display device before the active signal is transmitted to allow images on the display device to be displayed unobstructed by the pointer.

35. The pointing device of claim 34, wherein the position signals describe a coordinate on a defined coordinate system of the display device to move the pointer.

36. The pointing device of claim 34, wherein the navigation unit comprises at least one of a trackball, a touch pad, a joystick, and a plurality of navigation buttons.

37. The pointing device of claim 34, wherein the selection unit comprises a button so that a user can make a selection by positioning the pointer with the navigation unit and pushing the selection button.

38. The pointing device of claim 34, wherein the selection signals are effective to notify a computer system at the remote location that a selectable identifier on a display device has been selected.

39. The pointing device of claim 34, wherein the sensor unit is triggered when the pointing device is being used.

40. The pointing device of claim 34, wherein the sensor unit is triggered whenever the navigation unit or the selection unit is being used.

41. The pointing device of claim 34, wherein the sensor unit comprises a pressure sensor.

42. The pointing device of claim 41, wherein the pressure sensor is located on the bottom of the pointing device.

43. The pointing device of claim 41, wherein the sensor unit comprises a motion sensor.

44. The pointing device of claim 34, wherein the pressure sensor is located where a person using the pointing device would have to depress it.

45. The pointing device of claim 34, wherein the transmission unit transmits to a wireless interface of an entertainment system.

46. The pointing device of claim 45, wherein the active signal is effective to display the pointer on a display device of the entertainment system.

* * * * *

UNITED STATES PATENT AND TRADEMARK OFFICE
CERTIFICATE OF CORRECTION

PATENT NO. : 6,911,968 B2  Page 1 of 1
DATED : June 28, 2005
INVENTOR(S) : Shah-Nazaroff It is certified that error appears in the above-identified patent and that said Letters Patent is hereby corrected as shown below:

Column 8,
Lines 27-28, delete "wireless remote control unit".

Signed and Sealed this

Sixth Day of September, 2005

JON W. DUDAS
*Director of the United States Patent and Trademark Office*